United States Patent
Jiang

(10) Patent No.: US 12,054,017 B2
(45) Date of Patent: Aug. 6, 2024

(54) ANTI-THEFT TIRE CAP

(71) Applicant: Rexpair Industry Ltd., Newark, DE (US)

(72) Inventor: Yongbo Jiang, Newark, DE (US)

(73) Assignee: Rexpair Industry Ltd., Newark, DE (US)

( * ) Notice: Subject to any disclaimer, the term of this patent is extended or adjusted under 35 U.S.C. 154(b) by 312 days.

(21) Appl. No.: 17/712,823

(22) Filed: Apr. 4, 2022

(65) Prior Publication Data

US 2023/0311595 A1 Oct. 5, 2023

(51) Int. Cl.
*B60C 29/06* (2006.01)
*F16B 41/00* (2006.01)

(52) U.S. Cl.
CPC .......... *B60C 29/066* (2013.01); *F16B 41/005* (2013.01)

(58) Field of Classification Search
CPC ....... B60C 29/00; B60C 29/005; B60C 29/06; B60C 29/066; B60R 25/01; F16B 41/005; F16K 35/00
See application file for complete search history.

(56) References Cited

U.S. PATENT DOCUMENTS

| | | |
|---|---|---|
| 2,803,284 A | 8/1957 | Mullen |
| 3,313,189 A | 4/1967 | Lewis |
| 3,625,094 A | 12/1971 | Garrison |
| 3,783,715 A | 1/1974 | Niconchuk |
| 4,424,295 A | 1/1984 | Van Ornum et al. |
| 4,930,377 A | 6/1990 | Lester |
| 5,791,371 A * | 8/1998 | Kemp, II ................ F16K 35/00 137/233 |
| 6,062,787 A * | 5/2000 | Maddalena ........... F16B 41/005 411/432 |
| 9,067,368 B2 | 6/2015 | Kerner |
| 10,611,103 B2 | 4/2020 | Park et al. |

(Continued)

FOREIGN PATENT DOCUMENTS

| | | |
|---|---|---|
| CN | 303689177 | 6/2016 |
| CN | 208278491 | 12/2018 |

(Continued)

OTHER PUBLICATIONS

International Search Report, dated Jun. 15, 2017 for PCT/JP2016/082394, 15 pages.

*Primary Examiner* — Benjamin R Schmitt
(74) *Attorney, Agent, or Firm* — Foster Swift Collins & Smith PC; Mikhail Murshak

(57) ABSTRACT

An anti-theft tire valve includes: (a) a sleeve defining an outer wall and an pass-through channel to receive a threaded valve stem and allow a portion of the threaded valve stem to extend through an upper portion of the sleeve; (b) an internal threaded portion positioned within the upper portion of the sleeve configured to securely engage the threaded valve stem; (c) a torque locking surface defined on an external surface of the upper portion of the sleeve; and (d) a valve cap forming a cover and defining an internal thread configured to receive the threaded valve stem and abut an upper rim of the sleeve. The torque locking surface is configured to receive a locking wrench to rotate in a counter direction and press against the valve cap forming a tension lock configured to restrict the removal of the valve cap without the use of an external tool.

20 Claims, 8 Drawing Sheets

(56) References Cited

U.S. PATENT DOCUMENTS

2004/0237733 A1* 12/2004 Lewis .................. B25B 13/485
  81/461
2016/0082678 A1   3/2016 Rivera
2019/0077099 A1   3/2019 Park et al.

FOREIGN PATENT DOCUMENTS

GB           1023030      3/1966
WO    WO2017098835       6/2017

* cited by examiner

ANTI-THEFT TIRE CAP

TECHNICAL FIELD

The present disclosure relates generally to a tire air valve cap and method of use.

BACKGROUND

The statements in this section merely provide background information related to the present disclosure and may not constitute prior art.

Vehicles of all kinds assist individuals and society with transportation, whether that be for the transportation of people or of goods and commerce. Invariably, when that mode of transportation is disrupted, the disruption of the essential function of that transportation has ripple down effects, such as delays of the delivery of the goods or people. Certain vehicles, such as automobiles, trucks, motorcycles, bicycles, and airplanes, utilize tires. The tire holds air at a certain air pressure to give it a functional shape, firmness, and flexibility to help move the vehicle down a road or path and is often made from rubber. Maintaining the correct air pressure is desired to keep the tire functioning property.

Air pressure can be controlled by a valve extending through a wall of the tire. Air can be supplied through the valve to increase the tire pressure or release through the valve. Air is kept in the tire by a backflow prevention mechanism arranged within the valve. The valve can be arranged on an outer wall of the tire to allow for sufficient access for filling or deflating. By the nature of its placement, the valve may be exposed to the elements creating a risk of corrosion and mechanical failure. A common solution to address this risk is to provide a threaded plastic cap attached to a threaded valve stem. A simple plastic cap leaves the valve vulnerable to unauthorized tampering and manipulation. Tampering with the valve could deflate a tire and make a vehicle inoperable.

While some devices exist to protect the valve stem from tampering or corrosion, they are difficult to install and remove from the tire stem. A need exists for improved tire caps.

SUMMARY

The present disclosure provides for an anti-theft valve cap for a tire including: (a) a sleeve defining an outer wall and an interior pass-through channel configured to receive a threaded valve stem and allow a portion of the threaded valve stem to extend out from the pass-through channel; (b) sleeve internal mating threads formed along an interior surface of the sleeve configured to securely engage the threaded valve stem; (c) a torque locking surface formed adjacent to and around an outer rim of the sleeve; and (d) a valve cap forming a cover and defining cap internal threads configured to receive a portion of the threaded valve stem and abut against the outer rim of the sleeve. The torque locking surface is configured to engage with a locking wrench to rotate in a counter rotation and press against the valve cap forming a compression tension lock configured to restrict removal of the valve cap without using an external tool.

In an example, the valve cap and the sleeve are cylindrical and define identical external diameters. The torque locking surface can define an external perimeter smaller than the external diameter of the sleeve and valve cap forming a gap between the sleeve and valve cap. Each of the sleeve and valve cap can define an external surface having a decorative design that match.

The sleeve extends down a length of the valve stem configured to rigidly support a flexible structure of the valve stem. The torque locking surface can define a hexagonal geometry configured to engage with the locking wrench. The pass-through channel defines an internal diameter sufficient to tightly surround a portion of the valve stem.

The present disclosure further provides for installing an anti-theft valve cap onto an air-valve stem of a tire, including the steps of: (a) providing an anti-theft valve cap as previously described; (b) threading the sleeve onto the threaded valve stem until a portion of the threaded valve stem extends out from the pass-through channel; (c) threading the valve cap with the threaded valve stem until a rim of the valve cap abuts against the outer rim of the sleeve; and (d) engaging the torque locking surface with the locking wrench to rotate the sleeve counter rotate forming a locking compression tension between the sleeve and valve cap.

The present disclosure still further provides for an anti-theft valve cap kit including: (a) a sleeve defining an outer wall and an interior pass-through channel configured to receive a threaded valve stem and allow a portion of the threaded valve stem to extend out from the pass-through channel, the sleeve having internal mating threads provided within the sleeve configured to securely engage the threaded valve stem, wherein a torque locking surface is formed adjacent to and around an outer rim of the sleeve; (b) a valve cap forming a cover and defining valve cap internal threads configured to receive a portion of the threaded valve stem and abut against the outer rim of the sleeve; and (c) a locking wrench configured to engage the torque locking surface to rotate counterclockwise to cause the outer rim of the sleeve to press against the valve cap forming a compression tension lock configured to restrict removal of the valve cap without the use of an external tool.

For purposes of summarizing the disclosure, certain aspects, advantages, and novel features of the disclosure have been described herein. It is to be understood that not necessarily all such advantages may be achieved in accordance with any one embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate example embodiments and methods of use for the present disclosure.

The various embodiments of the present disclosure will hereinafter be described in conjunction with the appended drawings, wherein like designations denote like elements.

DETAILED DESCRIPTION

Figure 1:
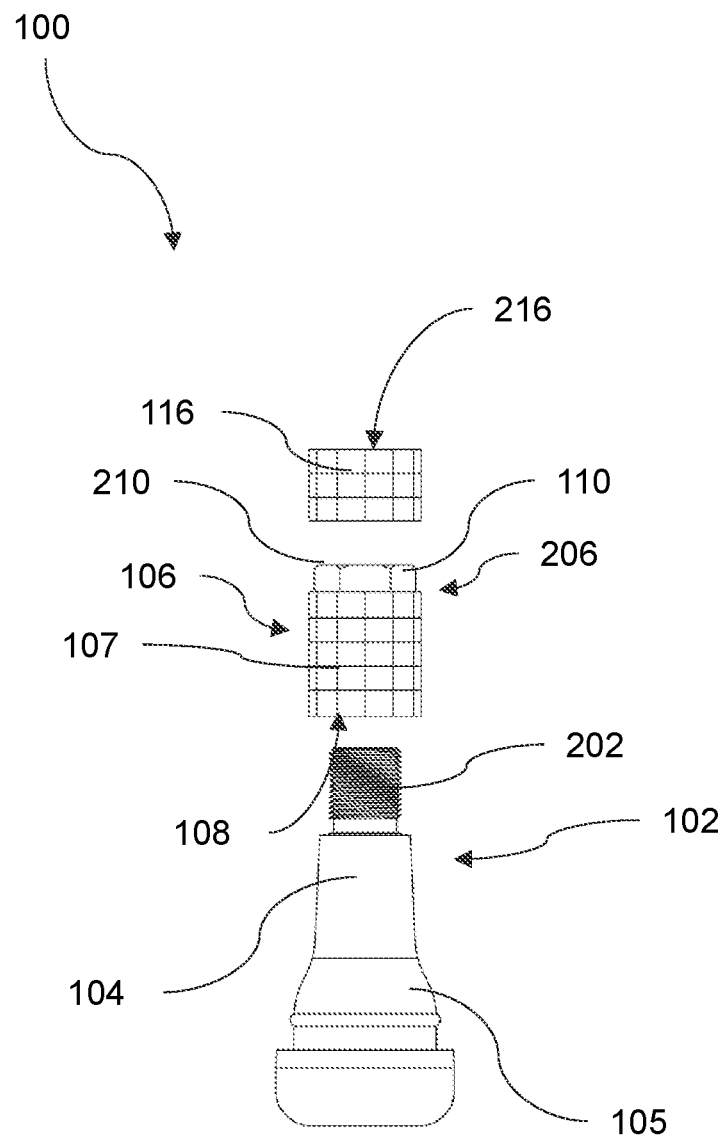
FIG. 1 illustrates a schematic view of an anti-theft valve cap system of the present disclosure in an exploded view positioned over a threaded valve stem.
Figure 2:
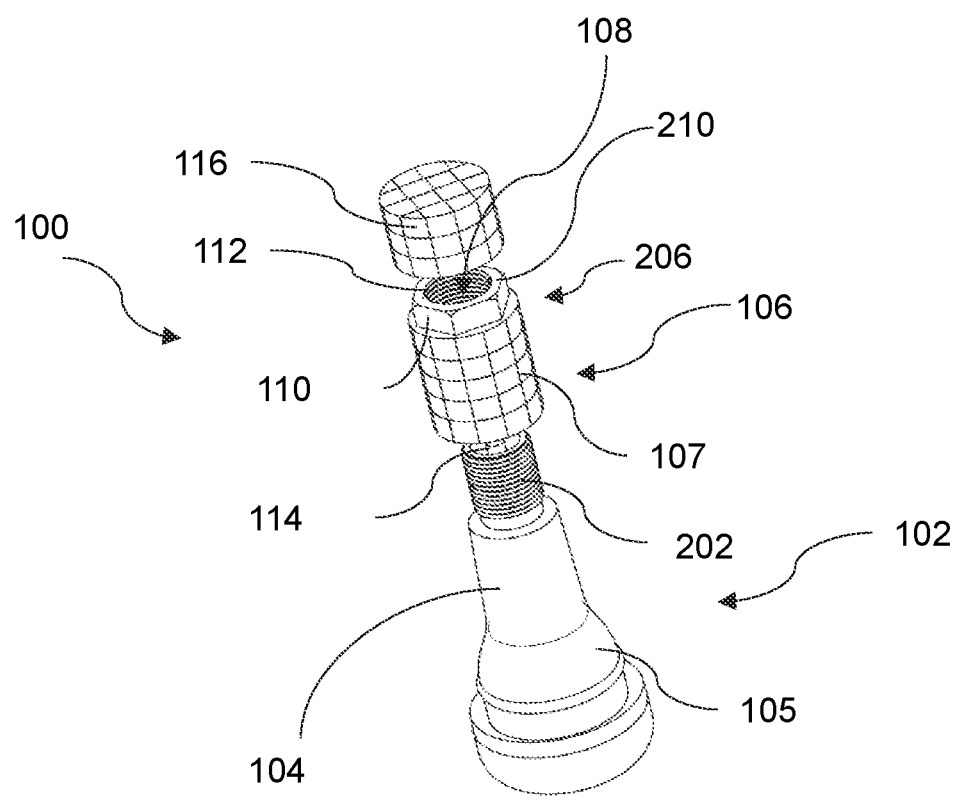
FIG. 2 illustrates a perspective exploded view of the anti-theft valve cap system of FIG. 1.
Figure 3:
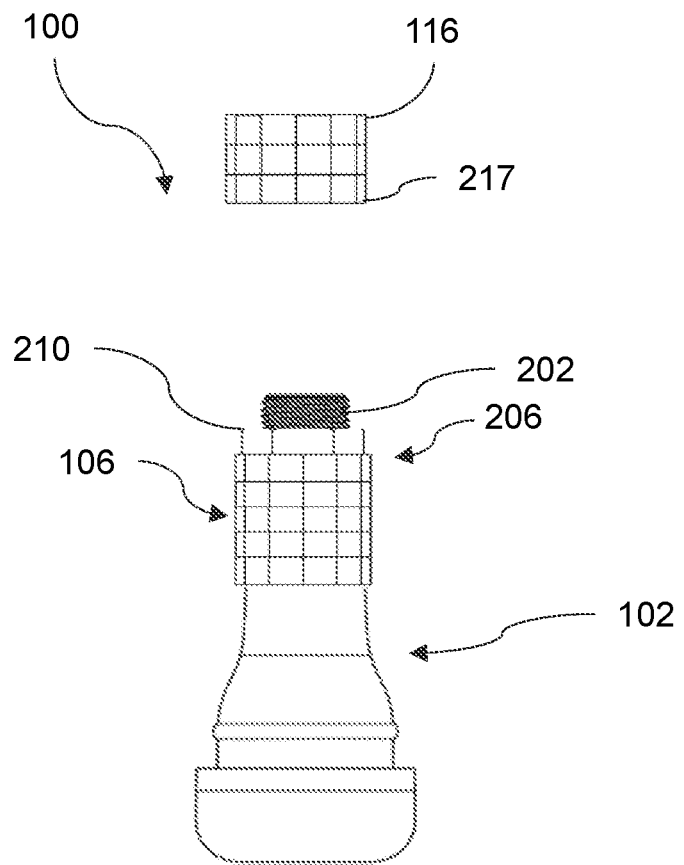
FIG. 3 illustrates the anti-theft valve cap system of FIG. 1 with a sleeve positioned onto a valve stem.

The following description is merely exemplary in nature and is not intended to limit the present disclosure, application, or uses. It should be understood that throughout the drawings, corresponding reference numerals indicate like or corresponding parts and features.

Referring to FIGS. 1-6, the present disclosure provides for an anti-theft tire valve cap system 100 and method for preventing and/or reducing risk for theft or unauthorized tampering or manipulation. In an example, system 100 includes an elongated sleeve 106 defining a pass-through channel 108 configured for placing over an existing valve stem 102 and allow at least some of threaded portion 202 to extend up and out from sleeve 106. A corresponding valve cap 116 is configured for placing over valve step 102 and engage the exposed threaded portion 202 and to abut against an upper rim of sleeve 106. Valve stem 102 can be any valve stem exposed out from a tire body to allow access for filling and deflating. Valve stem 102 is shown without the presence of a tire in FIGS. 1 and 2.

In this example, sleeve 106 extends down and over a portion of valve stem body 104. The valve stem 102 extends through pass-through channel 108 and out an upper portion 206 of the sleeve 106. System 100 further includes a valve cap 116 having a cavity for receiving threaded portion 202. Valve cap 116 forms a cover (or top) 216 that is shaped and sized to cover and prevent access to valve stem 102. In this example, mating threads are formed within the cavity of valve cap 116 to engage with exposed threads 202 extending from sleeve 106.

Sleeve 106 further includes a torque locking surface 110 formed on upper portion 206 of sleeve 106 and defining an upper rim 210. The torque locking surface 110 is configured to engage a locking wrench 300 to rotate the sleeve 106. In this example, once sleeve 106 and valve cap 116 are placed onto valve step 102, the threads of sleeve 106 and valve cap 116 engage threads 202 in a clockwise direction and the locking wrench 300 can be used to engage torque locking surface 110 to rotate sleeve 106 counterclockwise and form a compression tension lock between the valve cap 116 and the sleeve 106.

In an example, valve stem 102 includes a valve body 104. In a conventional tube-less design found on many vehicles, a valve stem 102 protrudes from the tire and a surface of a corresponding rim and body 104 is configured to retain and support the valve stem 102 within the wall of the rim. This allows air to pass through the valve stem 102 to help control the air pressure of the tire. In applications involving a tire tube such as a bicycle tire having an internal tube, the valve stem 102 protrudes from a surface of a rim and is connected to an interior tubing. An inflatable tire can be mounted on to a variety of vehicles such as an automobile, truck, motorcycle, bicycle, all-terrain vehicle, or any other type of apparatus requiring a wheel. The valve stem 102 includes threading 202 formed on an outer surface for receiving a threaded cap. In an example, the valve stem threads 202 define a standardized configuration of Schrader type valve dimensions on the exterior thereof. The threading of the valve stem 102 facilitates the installation and compression tension lock of the sleeve 106 and the valve cap 116.

The sleeve 106 is configured to be installed over the valve stem 102 by threading with the valve stem threads 202 and allowing a portion of threads 202 to extend out and from sleeve 102. In an example, sleeve 106 may be formed from a variety of materials including plastics, steel, stainless steel, aluminum, brass or the like. The material of sleeve 106 may be unfinished or be protectively coated with another material such as paint, plastic, rubber, chrome plating, or the like.

Elongated sleeve 106 includes an outer wall 107 and defines an internal pass-through channel 108. The pass-through channel 108 traverses an entire length of the sleeve 106 in an axial direction. Internal threads 112 are formed within the pass-through channel 108 and positioned at the top portion 206. The pass-through channel 108 is configured to receive the valve stem 102. The pass-through channel 108 is sized to elongated to cover an extended portion of valve stem 102 while also defining a relatively shorter length than a length of valve stem 102. Thus, upon positioning sleeve 106 over valve stem 102 and threadedly engaging sleeve threads 112 with valve stem threads 202, a portion of threads 202 extend out through pass-through channel 108 and out from upper portion 206 of the sleeve 106 (See FIG. 3). The pass-through channel 108 may be configured to define an internal diameter sufficient to tightly surround a portion of the valve stem 102 when the sleeve 106 is assembled on the valve stem 102.

Internal threaded portion 112 is positioned within an interior surface of upper portion 206 of the sleeve 106. Internal threaded portion 112 is configured to securely engage threads 202 of threaded valve stem 102 by defining complementary threading pattern to the valve stem 102.

The internal threaded portion 112 allows for the secure attachment of the sleeve 106 to the valve stem 102. In an example, the sleeve 106 is screwed on to the valve stem 102 in a clockwise direction until threads 202 extend out from sleeve 106. When sleeve 106 is fully tightened to the valve stem 102, a portion of the valve stem extends out and away from the sleeve 106. A portion of valve stem 102 is exposed allowing for access to a portion of threads 202.

Sleeve 106 extends over body 104 and can be configured to provide added structural support and/or added protective covering for the valve stem 102. Added structural support and cover can protect valve stem 102 from exposure to elements and relatively harsh conditions during vehicle use. This can reduce or prevent damage and increase the lifespan of the valve stem. When the anti-theft valve cap system 100 is fully assembled on to a valve stem 102, the sleeve extends down the body 104 to abut against a base 105. When installed onto a wheel 400, base 105 is positioned within a rim 404. The sleeve 106 can function as a rigid protective jacket over a narrower region of the valve stem 102 and body 104. The sleeve 106 can provide added protection against compression of the valve stem 102 into the rim 404 and shearing of the stem in a perpendicular direction to the rim 404. If compression or shearing forces are applied to the stem, the lower rim of the rigid sleeve 106 is pressed against the base 105 of the body 104, thus resisting damage.

Valve cap 116 forms a cover for valve stem 102. Valve cap 116 defines an internal thread within an internal cavity configured to engage with threads 202 of valve stem 102. The internal thread of valve cap 116 can be configured to be complementary to the threading of the valve stem 102 such that the valve cap 116 connects to threads 202 through a clockwise rotation.

In an example, sleeve 106 and valve cap 116 are cylindrical defining a matching or identical external diameter D. Providing identical diameters provides an aesthetically pleasing design while also discouraging manipulation by giving the appearance of a unitary conventional valve cap. In another example, the sleeve 106 and the valve cap 116 each define a decorative design on their respective outer surfaces, and in yet another example, the decorative designs match or are identical to form a uniform design aesthetic. This can serve as a deceptive functionality offering a further anti-theft advantage. In yet another example, the valve cap 116 forms a cover 216 having an identical or different decorative design from the sleeve 106 or the rest of the outer surface of the valve cap 116.

The valve cap 116 may be formed from a variety of materials including plastics, steel, stainless steel, aluminum, brass or the like. The material of the valve cap 116 may be unfinished or be protectively coated with another material such as paint, plastic, rubber, chrome plating, or the like.

The valve cap 116 can be configured be screwed onto the threaded valve stem 102 in a clockwise direction until the valve cap 116 reaches a tightened state. In the tightened state, a lower rim 217 of the valve cap 116 abuts an upper rim 210 of the sleeve 106.

Sleeve 106 further includes a torque locking surface 110 formed at upper portion 206 on an external surface of upper portion 206. The torque locking surface 110 is configured to facilitate counter rotation of the sleeve 106 relative to the thread configuration of the components. If sleeve 106 and valve cap 116 engage valve stem threads 202 in a clockwise rotation, then torque locking surface 110 can engage an external tool, like a locking wrench 300 to rotate counterclockwise. This would unscrew sleeve 106 in the absence of a physical barrier. The presence of valve cap 116 abuts against sleeve 106 forming a compression tension.

Counterclockwise rotation of the sleeve 106 results in the upper rim 210 of the sleeve 106 to press against the lower rim 217 of valve cap 116. As the sleeve 106 is rotated in the counterclockwise direction, the sleeve correspondingly presses against the valve cap 116 with increasing force. Thus, a compression tension lock is formed once the sleeve 106 is fully tightened against the valve cap 116. The compression tension lock formed from the counterclockwise rotation of the sleeve 106 is configured to cause the valve cap 116 to be pressed against the sleeve 106 so tightly that the valve cap 116 cannot be removed absent an external tool. The compression tension lock may be released by clockwise rotation of the sleeve 106 using a corresponding wrench or possibly by forced rotation from an external tool.

The torque locking surface 110 can be configured such that the external diameter of the torque locking surface 110 is smaller than the external diameter of the sleeve 106 and the valve cap 116. Thus, a physical and visual gap 11 is formed between the sleeve 106 and the valve cap 116. This gap allows access for the torque wrench, but it can also allow for easy identification of the torque locking surface 110, for example during low light scenarios such as filling up tires with air at night or in a garage. A user may simply feel for the torque locking surface 110 in the dark to find its location. The gap 111 also serves as further visible concealment as the anti-theft cap 100 appears to be a unitary structure.

Figure 4:
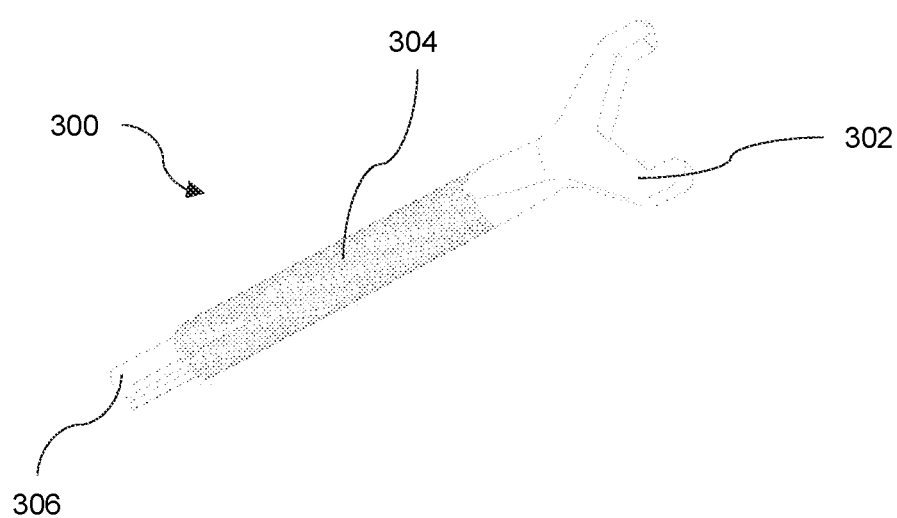
FIG. 4 illustrates an example locking wrench for use with an anti-theft valve cap system of the present disclosure.
Figure 5:
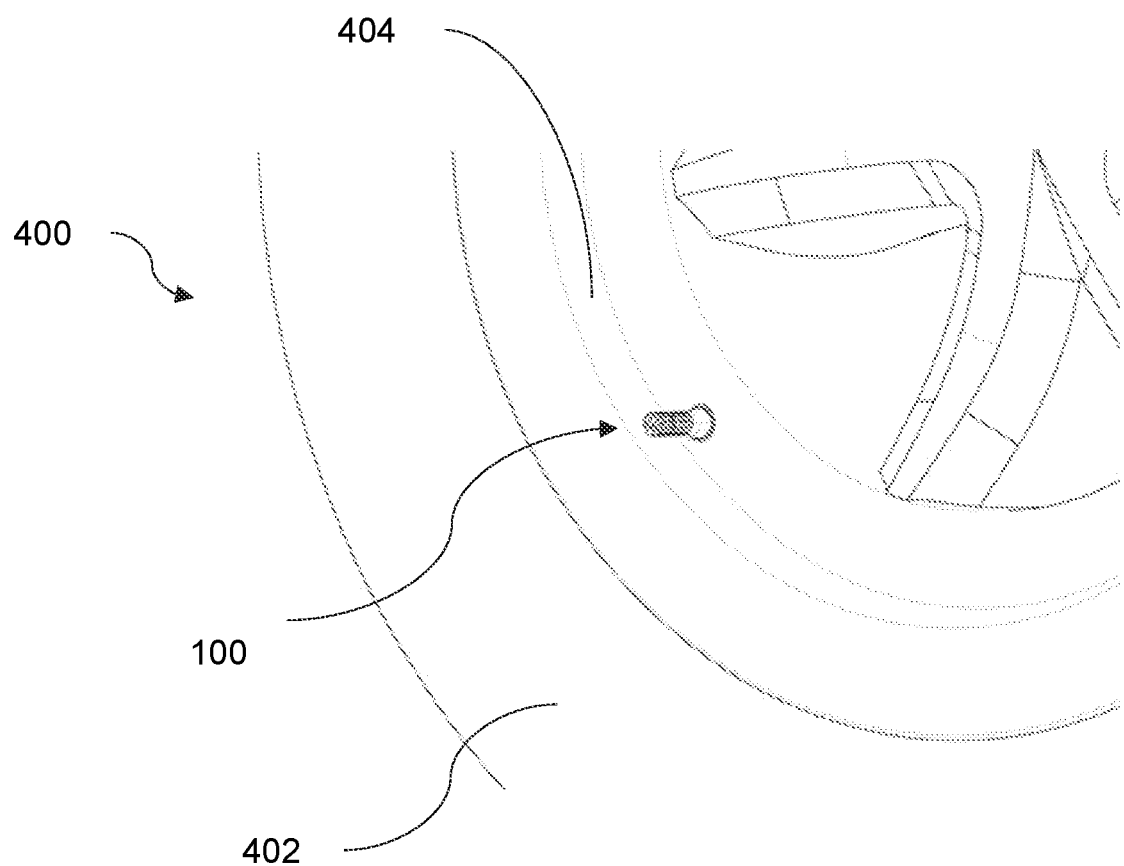
FIG. 5 illustrates an anti-theft valve cap system of the present disclosure installed on a valve stem of a vehicle tire.
Figure 6:
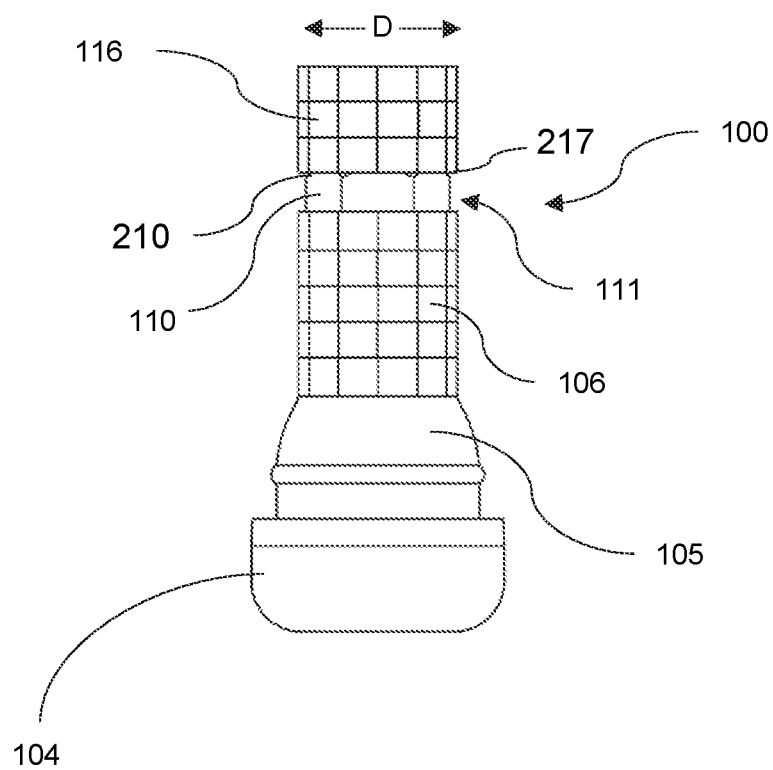
FIG. 6 illustrates a schematic of the anti-theft valve cap system of FIG. 1 fully mounted on a valve stem.

Torque locking surface 110 is configured to receive a locking wrench 300. In this example, the torque locking surface 110 defines a hexagonal cross-section geometry having six sides accessible by wrench 300. As shown in FIG. 4, the locking wrench 300 includes an open end 302, an arm 304, and an optional handle end 306. The open end 302 may be configured to have a profile in a fixed position corresponding to a shape and size sufficient to engage locking surface 110. In another example, the open end 302 may also be arranged to have an adjustable jaw like a "crescent" wrench. The handle end 306 of the locking wrench 300 may also be configured to have complementary features or tools such as a valve core removal feature, an air release feature, or a tool retention feature for example a lanyard.

The profile of the open end 302 of the locking wrench 300 is configured to engage with the torque locking surface 110 of the sleeve 106. When the open end 302 is engaged with the torque locking surface 110, the locking wrench 300 provides improved leverage for rotation of the sleeve 106. For example, arm 304 of the locking wrench 300 can be utilized to provide increased torque in a counterclockwise rotation direction thus creating a stronger compression tension lock between sleeve 106 and cap 116.

The locking wrench 300 may be formed from a variety of materials including, plastic, steel, stainless steel, aluminum, brass, or the like. All or part of the locking wrench 300 may be coated with a protective material such as chrome plating, paint, or plastic.

Locking wrench 300 may include a valve core removal tool arranged on handle end 306. The valve core removal feature on handle end 306 may be used by inserting it into a valve stem 102 in an axial direction and rotating to remove a valve mechanism 114. A valve core removal tool can be helpful for proper maintenance of a tire in which a damaged or corroded valve mechanism 114 may need replacing. A damaged or corroded valve mechanism 114 may lead to air pressure loss or valve failure.

In yet another example, the anti-theft tire valve cap may be installed on a vehicle wheel 400. A tire 402 of the vehicle wheel 400 circumferentially surrounds a rim 404 of the vehicle wheel 400. As shown, the anti-theft tire valve cap 100 is arranged on a valve stem that is mounted on a side wall of the rim 404. The valve stem is arranged such that it extends through the rim 404 and into the space between the tire 402 and rim 404. In a tubeless vehicle wheel 400, the valve stem provides for the inflation or deflation of the tire 402 such that air may be introduced or removed in the space between the tire 402 and the rim 404.

Figure 7:
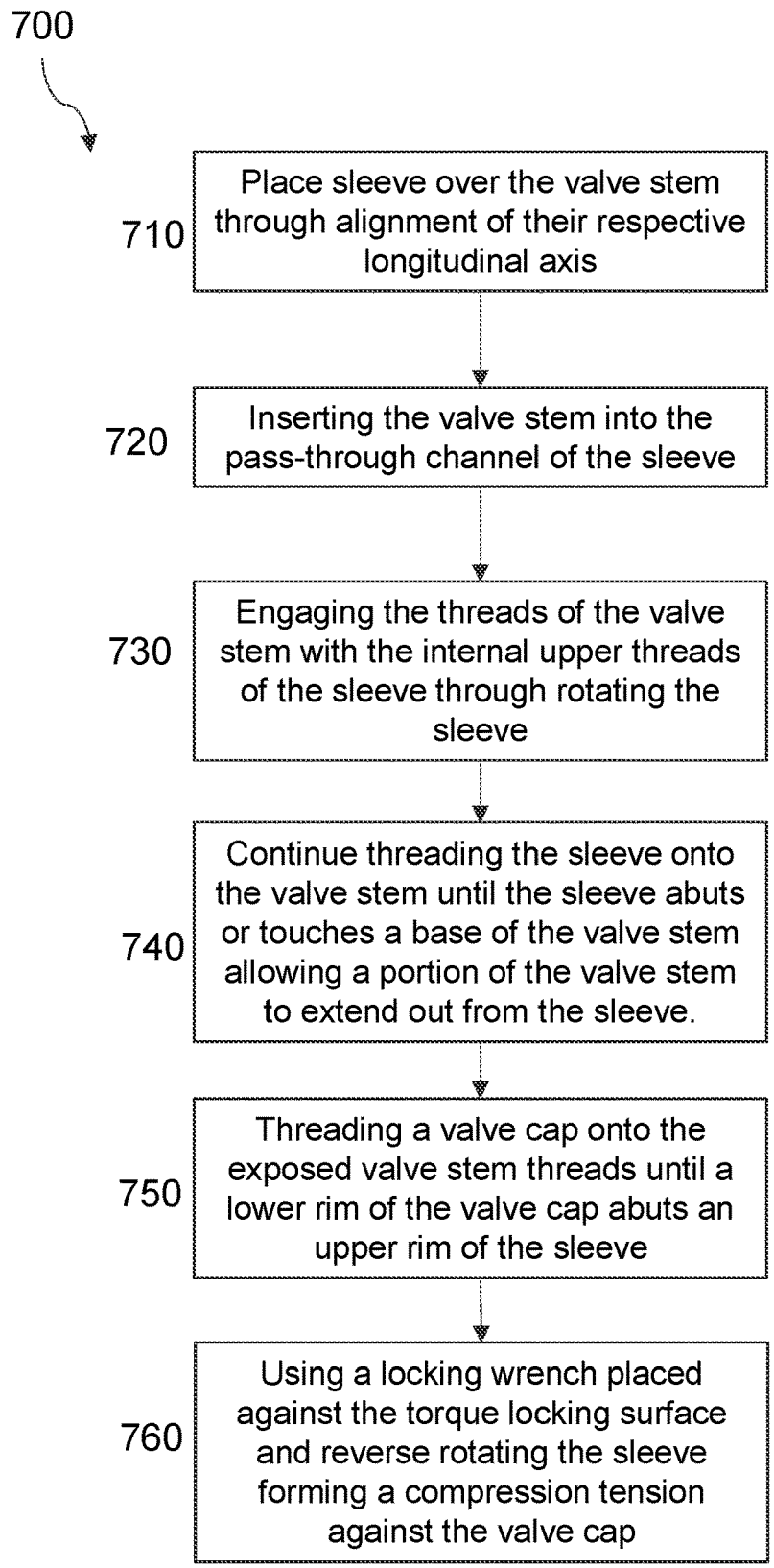
FIG. 7 is a flowchart showing an example method of use of the present disclosure.

Referring to FIG. 7, an example flowchart 700 for a method of use of the anti-theft valve cap 100 is provided. Beginning with step 710, to install an anti-theft valve cap 100, the sleeve is first placed over the valve stem by aligning the longitudinal axis of the sleeve 106 with the longitudinal axis of the valve stem 102. At step 720, the sleeve 106 is positioned over the threaded valve stem 102 such that the threaded valve stem 102 is inserted into the pass-through channel 108 of a lower portion of the sleeve 106 and extends through the pass-through channel 108 to the upper portion of the sleeve 106. At step 730, the threads 202 of the valve stem 106 engage with the threaded region 112 of the pass-through channel 108. Thereafter, the sleeve 106 is rotated about a longitudinal axis, for example in a clockwise direction, resulting in the engagement of the threading of the valve stem 102 and the threaded region 112 of the pass-through channel 108. At step 740, threading continues until a portion of the sleeve abuts or touches a base 104 of the valve stem 102 allowing a portion of the valve stem 102 to extend out from the sleeve 106 and thus exposing a portion of threads 202 of valve step 102. Next, at box 750, the valve cap 116 engages the exposed valve stem 102 which extends out and above the sleeve 106. Valve cap 116 a user may rotate the valve cap 116 is then rotated and threaded onto the exposed threads. Such rotation may occur until the valve cap 116 abuts an upper rim of the sleeve 106.

At box 760, locking wrench 300 engages the torque locking surface 110 of the sleeve 106 and counter rotates the sleeve 106. The locking wrench 300 can engage the torque locking surface 110 from a perpendicular direction in relation to a longitudinal axis of the sleeve 106. Once the locking wrench 300 is engaged, the user may rotate the locking wrench 300 in a counter rotation manner (i.e., counterclockwise if the sleeve was installed in a clockwise rotation). This counter rotation imparts a counter rotation on both the torque locking surface 110 and the sleeve 106 causing the upper rim 210 of sleeve 106 to press against the lower rim 217 of the valve cap 116 forming a compression tension lock causing the upper cap portion 116 and lower cap portion 106 to seize against each other. The increased leverage of the locking wrench 300 imparts increased torque on the sleeve 106 such that the strength of the tension lock prevents or reduces undesired disassembly by hand. The strength of the tension lock prevents or reduces the risk of unauthorized tampering or removal of the anti-theft valve cap 100 without the use of an external tool.

To disassemble the anti-theft valve cap 100, the locking wrench 300 engages the torque locking surface 110 on the sleeve 106 and rotates the sleeve in a release rotational direction to loosen the tension. For example, a clockwise rotation would release the tension lock when the sleeve and cap were threaded in a clockwise direction. Once the tension lock has been released, the rest of the removal of the anti-theft valve cap 100 may be completed by first removing the valve cap through counter rotation and then the same for the sleeve.

Figure 8:
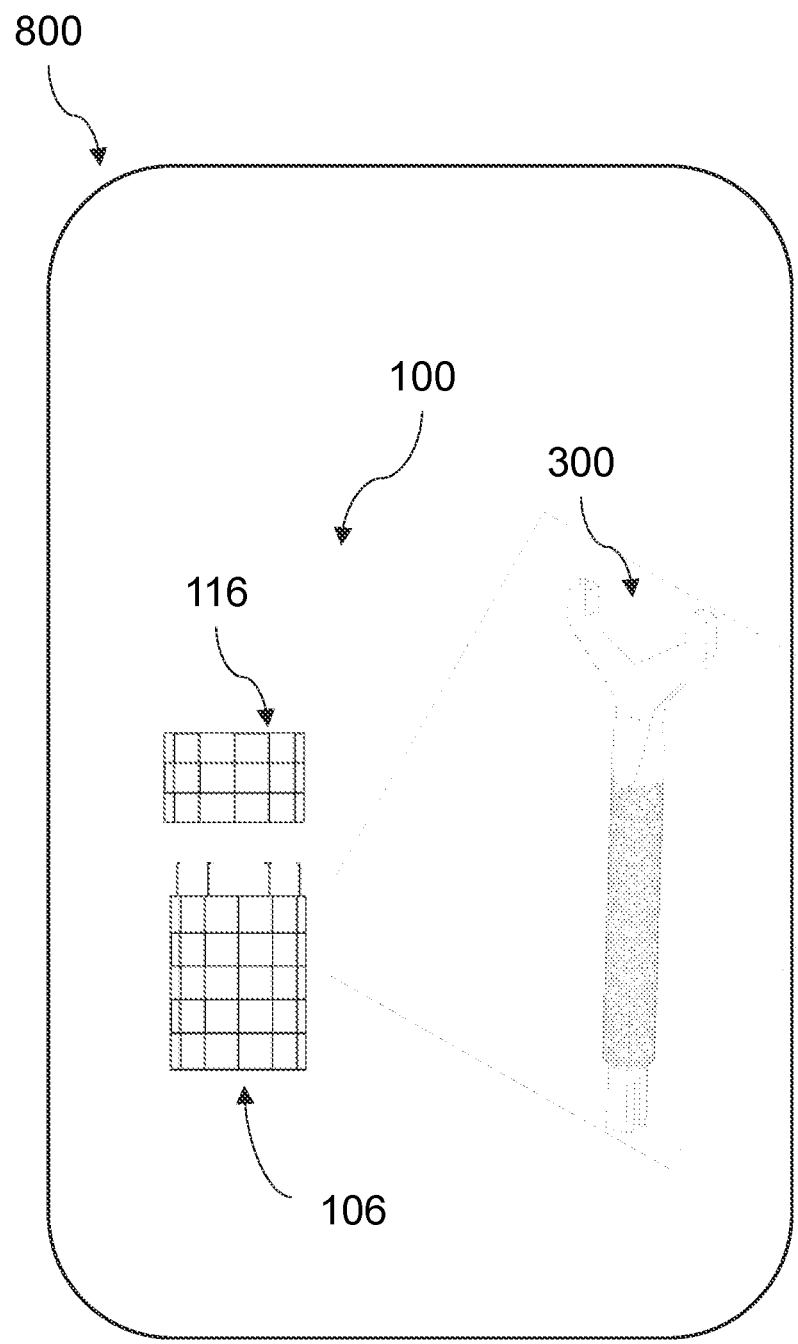
FIG. 8 is a schematic showing a kit for an anti-theft valve cap system according to the present disclosure.

Referring to FIG. 8, the present disclosure still further provides for an anti-theft valve cap kit 800 that includes the anti-theft valve cap system 100 and a wrench 300. The valve cap system 100 includes a sleeve 106 and a valve cap 116. A locking wrench 300 is provided configured to engage a torque locking surface to rotate the sleeve in a counter direction upon installation and the presence of the valve cap to cause a compression tension lock to form configured to restrict removal of the valve cap without the use of an external tool.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An anti-theft valve cap for a tire comprising:
   (a) a sleeve defining an outer wall and an interior pass-through channel configured to receive a threaded valve stem and allow a portion of the threaded valve stem to extend out from the pass-through channel;
   (b) sleeve internal mating threads formed along an interior surface of the sleeve configured to securely engage the threaded valve stem;
   (c) a torque locking surface formed adjacent to and around an outer rim of the sleeve;
   (d) a valve cap forming a cover and defining cap internal threads configured to receive a portion of the threaded valve stem and abut against the outer rim of the sleeve;
   wherein the torque locking surface is configured to engage with a locking wrench to rotate in a counter rotation and press against the valve cap forming a compression tension lock configured to restrict removal of the valve cap without using an external tool.

2. The anti-theft valve cap of claim 1, wherein the valve cap and the sleeve are cylindrical and define identical external diameters.

3. The anti-theft valve cap of claim 2, wherein the torque locking surface defines an external perimeter smaller than the external diameter of the sleeve and valve cap forming a gap between the sleeve and valve cap.

4. The anti-theft valve cap of claim 1, wherein each of the sleeve and valve cap define an external surface having a decorative design that match.

5. The anti-theft valve cap of claim 1, wherein the sleeve extends down a length of the valve stem configured to rigidly support a flexible structure of the valve stem.

6. The anti-theft valve cap of claim 1, wherein the torque locking surface defines a hexagonal geometry configured to engage with the locking wrench.

7. The anti-theft valve cap of claim 1, wherein the pass-through channel defines an internal diameter sufficient to tightly surround a portion of the valve stem.

8. A method for installing the anti-theft valve cap of claim 1 onto an air-valve stem of a tire, comprising:
   (a) providing the anti-theft valve;
   (b) threading the sleeve onto the threaded valve stem until a portion of the threaded valve stem extends out from the pass-through channel;
   (c) threading the valve cap with the threaded valve stem until a rim of the valve cap abuts against the outer rim of the sleeve; and
   (d) engaging the torque locking surface with the locking wrench to rotate the sleeve in a counter rotation forming a locking compression tension between the sleeve and valve cap.

9. The method of claim 8, wherein the valve cap and the sleeve are cylindrical and define identical external diameters.

10. The method of claim 9, wherein the torque locking surface defines an external perimeter smaller than the external diameter of the sleeve and valve cap forming a gap between the sleeve and valve cap.

11. The method of claim 8, wherein the sleeve and valve cap define an external surface having a decorative design that match.

12. The method of claim 8, wherein the cover of the valve cap defines a cover decorative design that matches the decorative design of the sleeve and valve cap.

13. The method of claim 8, wherein the torque locking surface defines a hexagonal geometry configured to engage with the locking wrench.

14. The method of claim 8, wherein the sleeve extends down a length of the valve stem configured to rigidly support a flexible structure of the valve stem.

15. An anti-theft valve cap kit comprising:
   (a) a sleeve defining an outer wall and an interior pass-through channel configured to receive a threaded valve stem and allow a portion of the threaded valve stem to extend out from the pass-through channel, the sleeve having internal mating threads provided within the sleeve configured to securely engage the threaded valve stem, wherein a torque locking surface is formed adjacent to and around an outer rim of the sleeve;

(b) a valve cap forming a cover and defining valve cap internal threads configured to receive a portion of the threaded valve stem and abut against the outer rim of the sleeve; and (c) a locking wrench configured to engage the torque locking surface to rotate the sleeve in a counter rotation to cause the outer rim of the sleeve to press against the valve cap forming a compression tension lock configured to restrict removal of the valve cap without the use of an external tool.

16. The anti-theft valve cap kit of claim 15, wherein the valve cap and the sleeve are cylindrical and define identical external diameters.

17. The anti-theft valve cap kit of claim 16, wherein the torque locking surface defines an external perimeter smaller than the external diameter of the sleeve and valve cap forming a gap between the sleeve and valve cap.

18. The anti-theft valve cap kit of claim 15, wherein the sleeve extends down a length of the valve stem configured to rigidly support a flexible structure of the valve stem.

19. The anti-theft valve cap kit of claim 15, wherein the torque locking surface defines a hexagonal geometry configured to engage with the locking wrench.

20. The anti-theft valve cap of claim 15, wherein the pass-through channel defines an internal diameter sufficient to tightly surround a portion of the valve stem.

* * * * *